United States Patent Office 3,407,172
Patented Oct. 22, 1968

3,407,172
STABILITY OF POLYOLEFINES
Gerhard Meyer, Obernburg, Erhard Siggel, Seckmauern uber Hochst Odenwald, Albert Schopf, Hering uber Hochst Odenwald, and Helmut Magerlein, Erlenbach, Germany, assignors to Vereinigte Glanzstoff-Fabriken A.G., Wuppertal-Elberfeld, Germany
No Drawing. Filed Jan. 26, 1965, Ser. No. 428,202
Claims priority, application Germany, Jan. 31, 1964, V 25,287
13 Claims. (Cl. 260—45.7)

ABSTRACT OF THE DISCLOSURE

Stabilizing a high molecular weight poly-α-monoolefine such as polypropylene against oxidation by heating it in finely divided dispersed form in a lower alkanol containing a small amount, e.g. 0.001 to 1% by weight with reference to the poly-α-monoolefine, of an organic peroxide under agitation at a temperature of about 80–160° C. for a period of about 4 to 10 hours, and then separating the poly-α-monoolefine from the dispersion. Examples of organic peroxides are methylethyl-ketone-peroxide and ti-tert.-butyl-peroxide. The resulting stabilized poly-α-monoolefine is useful in producing filaments, films and molded articles resistant to oxidation.

---

This invention is concerned with a process for treatment of high molecular weight polyolefines so as to improve their stability against oxidation. More particularly, the invention relates to a method of contacting a polyolefine with a specific treating agent under conditions which are sufficient to enhance the oxidation-resistance of the resulting polyolefine product.

It is known that valuable products in the form of filaments, films, foils or other extruded or molded articles can be produced from polyolefines obtained by the addition polymerization of monomeric olefines, such as the alpha-monoolefines of from 3 up to about 10 carbon atoms. Especially favorable properties are exhibited by solid high molecular weight polyolefines which have been obtained by the so-called low pressure polymerization process requiring the use of a stereospecific catalyst or the so-called Ziegler catalysts. Although such polyolefines have advantageous properties such as high strength, high density, relatively higher melting points and general resistance to chemical attack, they exhibit a somewhat limited stability against attack by oxygen, especially where there is simultaneous application of heat and/or exposure to ultraviolet rays. The damage shown by polyolefines under such oxidation conditions has been attributed to the presence of double bonds in or on the molecular chain of the polymer, these double bonds or olefinically unsaturated portions of the molecule being particularly susceptible to attack by oxygen. It does not appear to be possible to prevent or avoid the occurrence of these double bonds by any special precautions during polymerization. Therefore, in order to improve the stability of the polyolefine, it is apparently necessary to subject the polymer to an after-treatment which will tend to saturate the double bonds.

For example, it has been suggested that the polymer be subjected to a treatment with certain silicon compounds in which at least one hydrogen atom is attached directly to the silicon atom. In this known process, the polyolefine must be dissolved in a solvent and stirred for a relatively long period of time together with the silicon compound and a suitable catalyst. Aside from the fact that this process requires the use of considerable amounts of solvents and precipitation agents, it is unusually expensive because a thorough purification must be carried out after the treatment with the silicon compound and precipitation of the treated polymer from its solution.

According to an alternative of this known process, the stabilizing treatment can also be carried out by mixing the polyolefine with the silicon compound in an extruder at elevated temperatures, e.g. 250–300° C. However, a uniform stabilization is not obtained in this manner. Furthermore, this process suffers from the disadvantage that the silicon compound remains in the polymer.

In another known process, hydrogenation of the double bonds has been attempted in order to solve the problem of stabilization. The polyolefine in the form of a solution, emulsion or suspension is conducted through a suitable hydrogenation reaction vessel where it is brought into contact with a specific hydrogenation catalyst. This process requires a considerable expenditure in apparatus and time and is not suitable for treating large amounts of polyolefines. Finally, this method is disadvantageous in that the treated polyolefine must be subjected to additional steps for removal of the heterogeneous hydrogenation catalyst which would otherwise cause trouble in the normal processing of the polyolefine into finished articles.

The primary object of the present invention is to provide a process of treating a polyolefine which will lead to an improved product exhibiting better resistance to oxidation and aging, especially such oxidation as may occur in normal use of the polymer where it is exposed to heat and light.

Another object of the invention is to improve the stability of polyolefines against oxidation by a process or method which can be carried out in an economical manner and under easily controlled conditions.

Yet another object of the invention is to provide a process for improving the stability of polyolefines whereby conventional apparatus can be employed and the necessary steps can be readily combined with conventional polymerization processes for the production and separation of a substantially pure polyolefine.

Still another object is to improve the polyolefine stability by a process which permits the treatment of large quantities of the polymer on a commercial scale.

These and other objects and advantages of the invention will become more apparent after considering the following detailed specification.

It has now been found, in accordance with the present invention, that an improved polyolefine product can be obtained by dispersing the polyolefine as a finely divided powder in a lower alkanol containing a small amount of an organic peroxide, and heating this dispersion with mixing or agitation at elevated temperature, e.g. from about 65° C. to 190° C. and preferably about 80°–160° C., for a period of time sufficient to enhance the oxidation-resistance of the polyolefine. The polyolefine is then separated from the dispersion, for example by filtration, and is then preferably washed two or more times with the alkanol and finally dried by evaporation or distilling off any adherent alkanol.

The process of the present invention is particularly advantageous for the treatment of poly-alpha-monoolefines of from 3 up to about 8 carbon atoms in the monomeric alpha-monoolefine, and especially good results have been achieved with the treatment of the polyolefines of the 3 to 6 carbon atom monomers, e.g. polypropylene, polybutylene or poly-4-methylpentene-1. The results are also quite significant where the treatment is applied to stereoregulated or isotactic polyolefines as obtained by polymerization of the olefine under low pressure conditions in the presence of particular catalyst systems commonly referred to as stereospecific catalysts. These catalyst systems are well known in this art as well as the polymerization conditions and methods of recovering the isotactic polymer product, the preferred Ziegler catalyst contains TiCl₃ in combination with a trialkyl aluminum, e.g. triethyl aluminum.

The process of the invention is most conveniently carried out after the polyolefine has been purified, i.e. after polymerization has taken place and the polymer has been purified by removing and recovering the catalyst components therefrom. In the case of Ziegler type catalysts which are acid-soluble, the polymerization product is extracted with alcoholic-HCl, e.g. weak HCl in methanol, and the polymer is then washed and/or neutralized for substantially complete removal of the extractant and catalyst components. At this point, the purified polyolefine is in the form of a finely divided powder which can be readily subjected to the stabilizing treatment of the invention. Furthermore, the preceding steps are carried out in conventional apparatus with the substantial exclusion of oxygen and water, and the purified polyolefine can then be treated in the same apparatus under the same conditions of an oxygen-free and moisture-free environment, thereby avoiding any procedural complications in the overall process.

The purified polyolefine powder is normally obtained in conventional polymerization processes in a particle size which is quite suitable for the stabilizing treatment of the invention within a reasonable period of time. Smaller particles can usually be treated at lower temperatures and/or shorter periods of time. In general, it is desirable to use particle sizes of about 0.1 mm. to 500 mm.

The stabilizing treatment according to the invention can be carried out in any lower alkanol of about 1 to 7 carbon atoms, preferably the lower alkanols of 1 to 4 carbon atoms such as methanol, ethanol, propanol, isopropanol, butanol or isobutanols. Mixtures of such alkanols may also be used. The alkanols acts as a dispersing liquid in which the polyolefine powder can be suspended the during the treatment by means of any conventional stirring or mixing devices.

The organic peroxide employed as the treatment agent can be added to the alkanol dispersing agent in quite small amounts of at least 0.001% and preferably about 0.01 to 0.1% by weight, with reference to the total amount of the polyolefine. Larger amounts of the peroxide, e.g. more than 1–2% by weight should generally be avoided.

The preferred organic peroxides are as follows: dialkylperoxides such as di-tert.-butylperoxide, di-tert.-amylperoxide, or 2,2-bis-(tert.-butylperoxide)-butane; diacyl-peroxides such as a diacetylperoxide or dilauroylperoxide; and ketone peroxides such as cyclohexanone-peroxides or methylethylketone-peroxide. Other suitable organic peroxides include the following: cumene hydroperoxide, t-butyl hydroperoxide, cyclohexyl hydroperoxide, methylcyclohexyl hydroperoxide, p-methane hydroperoxide, methylamylketone peroxides, dibenzoyl peroxide, acetyl benzoyl peroxide, disuccinyl peroxide, 2,4-dichlorobenzoyl peroxide, dicaproyl peroxide, t-butyl perbenzoate, di-t-butyl pherphthalate, t-butyl permaleic acid, isopropyl percarbonate, peracetic acid, dibutyryl peroxide, t-butyl peracetate, dicumene peroxide, hydroxyheptyl peroxide, 1 - hydroxycyclohexyl hydroperoxide - 1, dibenzaldiperoxide.

The temperatures and periods of time for any specific treatment obviously depend on a number of different factors. At higher temperatures, the treatment can be completed more quickly, but temperatures above the melting point of the polyolefine must be avoided in order to prevent thermal decomposition. If it is desired to work at temperatures which lie above the boiling point of the alkanol, then it is necessary to use elevated pressures, for example by working in a closed vessel so that the treatment is carried out at the pressure set up by the temperature conditions. In general, the stabilizing treatment should be carried out with the exclusion of oxygen or air, since under these conditions the polyolefine may tend to decompose or form polymer hydroperoxides. Within the preferred temperature range cited above, the process of the invention is best carried out with treatment periods of about 4 to 10 hours.

By comparison with previously known stabilizing methods, the process of the present invention offers the advantage that it can be carried out directly in conjunction with the purification of the polymer without interfering with the normal polymerization or the separation and recovery of the polymerization catalyst and purified polymer. Another advantage resides in the fact that the alcohols employed as the dispersing agent for the polyolefine during the stabilizing treatment can likewise be employed in the preceding purification step. After completing the stabilizing treatment, the alkanol can be separated by filtration or centrifuging, and the polymer can be easily purified by washing with the alkanol in order to remove substantially all of the peroxide treating agent. Thus, it is possible to avoid a special purification as is required in known methods which use a heterogeneous catalyst for the stabilizing treatment. A much more uniform and extensive stabilization is obtained by contacting the polyolefine powder with the dispersed peroxide than is possible by incorporating or engraining a stabilizing agent into the polymer.

The process of the invention is further illustrated but not limited by the following examples.

EXAMPLES 1 AND 2

In a glass autoclave, 100 grams of polypropylene were dispersed in 600 ml. alcohol under a nitrogen atmosphere. The polypropylene was that produced by polymerization of propylene in the presence of aluminumtriethyl and TiCl₃ as a stereospecific catalyst. After completion of the polymerization, the polypropylene was purified with hexane and then with methanol in admixture with hydrochloric acid, washed neutral and then dried. To this dispersion there was added the organic peroxide, and the dispersion was then mixed and heated to an elevated temperature for the desired treatment time. Then, the dispersion was allowed to cool and the alcohol was filtered off. Thereafter, the polymer powder was washed twice, each time with 100 ml. of the same alcohol employed as the dispersing agent, and finally the powder was dried under nitrogen. The stability of the product was then determined. The results of two separate experiments carried out in this manner under specific process conditions are shown in the following table:

TABLE

| Alcohol | Peroxide | Percent by weight [1] | Treatment time, hours | Temp.,° C. | Stability, min. |
| --- | --- | --- | --- | --- | --- |
| (1) Methanol | Methylethyl-ketone-peroxide | 0.1 | 5 | 100 | 96 |
| (2) Ethanol | Di-tert.-butyl-peroxide | 0.05 | 6 | 130 | 86 |

[1] With reference to the amount of polypropylene.

EXAMPLE 3

Poly-4-methylpentene-1 was dispersed in methanol as in the previous examples and treated for 6 hours at 92° C. after addition of 0.1% by weight of di-tert.-butylperoxide (with reference to the polyolefine). After filtering off the alcohol and washing and drying the polymer powder as in the previous examples, a stability of 11 minutes was measured. By comparison, a non-treated product had a stability of only 4 minutes.

For determination of the stability of the treated polyolefine in the foregoing examples, 30 grams of the polymer powder were ground in a ball mill for a period of 30 minutes with a stabilizing mixture of 0.03 gram dilauryl-thiodipropionate and 0.03 gram of 4,4′-thio-bis-(3-methyl-6-t-butyl-phenol), i.e. 0.1% by weight in each case. 12 grams of this mixture were pressed in a plate press at 170° C. and under a pressure of 350 atm. into a 1 mm. thick plate. The plate was cut into strips 3–4 mm. wide and 30–40 mm. long from which 3 grams were introduced into a test tube standing in an aluminum block maintained at 200±1.5° C. and connected to an oxygen burette. By controlling the volume of oxygen, the time in minutes was determined for the spontaneous absorption of oxygen to begin. This induction period for the oxidation of the polymer at 200° C. in pure oxygen serves as a measure of the stability at room temperature. In the case of poly-4-methylpentent-(1), the measurement was carried out at 230° C. and the oxygen was introduced into the stabilized, unpressed powder contained in the test tube. Similar results can be achieved under conditions corresponding to the preceding examples by treating the polyolefine with other organic peroxides such as di-t-amyl-peroxide, 2,2-bis-(t-butylperoxide)-butane, cumene hydroperoxide, t-butyl hydroperoxide, cyclohexyl hydroperoxide, methylcyclohexyl hydroperoxide, p-methan hydroperoxide, cyclohexanone peroxide, methylamylketone peroxide, diacetyl peroxide, diberzoyl peroxide, acetyl benzoyl peroxide, dilauroyl peroxide, disuccinyl peroxide, 2,4-dichlorobenzoyl peroxide, dicaproyl peroxide, t-butyl perbenzoate, di-t-butyl perphthalate, t-butyl permaleic acid, isopropyl percarbonate, peracetic acid, dibutyryl peroxide, t-butyl peracetate, hydroxyheptyl peroxide, 1-hydroxycyclohexyl hydroperoxide-1, dibenzaldiperoxide and or the following alcohols: propanol, isopropanol, n-pentanol, i-pentanol, cyclohexanol, benzylalcohol and other aliphatic or arylaliphatic alcohols which are liquid at the working temperatures.

The invention is hereby claimed as follows:

1. A process for improving the stability of a high molecular weight poly-α-monoolefine of a 3 to 6 carbon atom monomeric monoolefine which comprises: dispersing said poly-α-monoolefine as a finely divided powder in a lower alkanol containing a small amount of an organic peroxide, heating said dispersion under substantial exclusion of air with agitation at an elevated temperature of about 65° C. to 190° C. and not higher than the melting point of the poly-α-monoolefine for a period of time sufficient to enhance the oxidation-resistance of said poly-α-monoolefine; and separating the polyolefine from the dispersion and removing from the finely divided poly-α-monoolefine substantially all of the peroxide remaining after said heating step.

2. A process as claimed in claim 1 wherein said organic peroxide is present in an amount of about 0.01 to 0.1% by weight, with reference to the poly-α-monoolefine.

3. A process as claimed in claim 1 wherein said dispersion is heated at a temperature of about 80° C. to 160° C. for a period of about 4 to 10 hours.

4. A process as claimed in claim 1 wherein said organic peroxide is a dialkyl-peroxide.

5. A process as claimed in claim 1 wherein said organic peroxide is a diacyl peroxide.

6. A process as claimed in claim 1 wherein said organic peroxide is a ketone peroxide.

7. A process as claimed in claim 1 wherein said alkanol is methanol.

8. A process as claimed in claim 1 wherein said alkanol is ethanol.

9. A process for improving the stability of a high molecular weight poly-α-monoolefine of a 3 to 6 carbon atom monomeric monoolefine which comprises: dispersing said poly-α-monoolefine as a finely divided powder in an alkanol of 1 to 4 carbon atoms containing about 0.01 to 0.1% by weight, with reference to the poly-α-monoolefine, of an organic peroxide; heating said dispersion under substantial exclusion of air with agitation at a temperature of about 80° C. to 160° C. and not higher than the melting point of said poly-α-monoolefine for a period of about 4 to 10 hours; separating the poly-α-monoolefine from said dispersion; and washing the separated poly-α-monoolefine with said alkanol for removal therefrom of substantially all of the peroxide remaining on said poly-α-monoolefine after said heating and separating steps.

10. A process as claimed in claim 9 wherein said poly-α-monoolefine is polypropylene.

11. A process as claimed in claim 9 wherein said poly-α-monoolefine is poly-4-methylpentene-1.

12. The stabilized poly-α-monoolefine product obtained by the process of claim 1.

13. The stabilized poly-α-monoolefine product obtained by the process of claim 9.

References Cited

UNITED STATES PATENTS

| 3,079,370 | 2/1963 | Precopio et al. | 260—94.9 |
| 3,272,771 | 9/1966 | Busche et al. | 260—94.9 X |

FOREIGN PATENTS

| 838,963 | 6/1960 | Great Britain. |
| 849,027 | 9/1960 | Great Britain. |

DONALD E. CZAJA, *Primary Examiner.*

M. J. WELSH, *Assistant Examiner.*